United States Patent [19]
Ospelt

[11] 3,769,136
[45] Oct. 30, 1973

[54] SOLVENT BONDING OF PLASTIC SHEET MATERIAL

[76] Inventor: Edwin K. Ospelt, 9494 Vahaan 737, Schaan, Liechtenstein, Germany

[22] Filed: May 15, 1970

[21] Appl. No.: 48,661

Related U.S. Application Data
[62] Division of Ser. No. 624,462, March 20, 1967, Pat. No. 3,586,583.

[30] Foreign Application Priority Data
Mar. 24, 1966 Germany .............................. P 39048

[52] U.S. Cl. ............... 156/308, 117/43, 117/104 R, 156/157, 156/307
[51] Int. Cl. .......................... B32b 31/12, C09j 5/02
[58] Field of Search ............. 117/43, 104 R, 111 A, 117/111 C, 111 D, 111 R, 112; 118/315; 156/157, 307, 308, 196, 201, 202, 204, 227, 304; 161/126; 223/28, 37; 24/38

[56] References Cited
UNITED STATES PATENTS
1,477,084 12/1923 Smith .................................... 74/232
2,932,340 4/1960 Poeschl .............................. 24/38 X
3,065,121 11/1962 Andrews ............................. 156/201
3,123,510 3/1964 Dolman et al. ..................... 156/204
3,156,608 11/1964 Kamins et al. ..................... 161/269
3,301,699 1/1967 Mozzi ................................. 117/111
2,452,879 11/1948 Tomkins et al. .................. 117/43 X
2,290,790 7/1942 Yeomans ............................. 117/104

Primary Examiner—Alfred L. Leavitt
Assistant Examiner—Robert A. Dawson
Attorney—Cushman, Darby & Cushman

[57] ABSTRACT

Sheets of plastics materials are automatically joined and solvent bonded or welded together by arranging two sheets to be joined together with the edges adjacent and overlapping, bending one edge up and the other down, spraying a plastics welding solvent on the opposing bent edges, closing and pressing the sprayed edges together until an inseparable connection is produced according to the claimed process. Several sheets thus joined together are suitable coverings for the roofs of buildings and the like.

1 Claim, 6 Drawing Figures

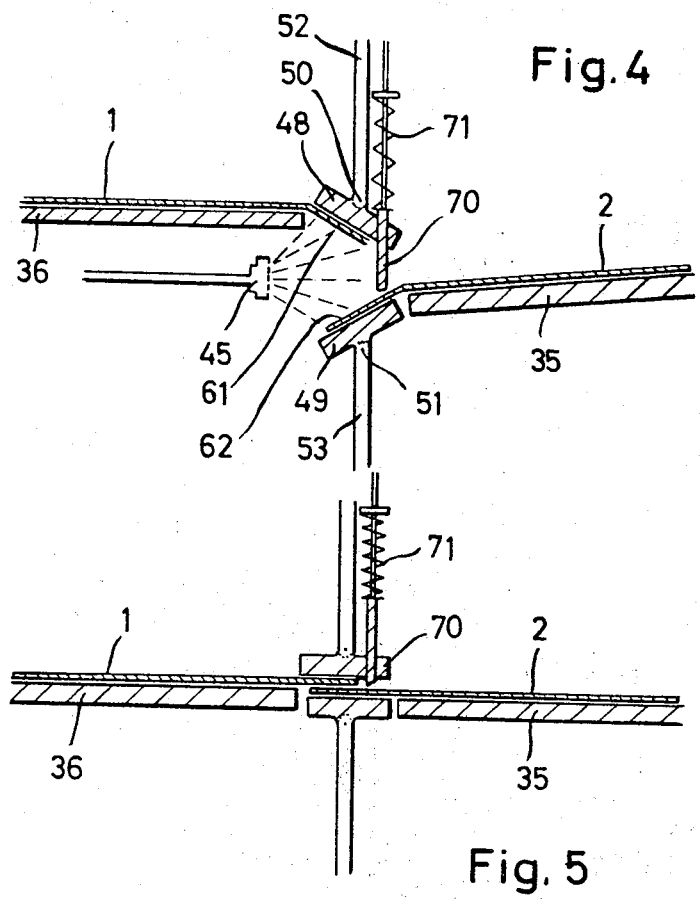

SOLVENT BONDING OF PLASTIC SHEET MATERIAL

This is a divisional application of my earlier application Ser. No. 624,462, filed Mar. 20, 1967 and now U.S. Patent No. 3,586,583.

The present invention relates to the production of large-area sheets formed of plastics, such as PVC or copolymers, particularly for the roofs of buildings.

It is a known procedure to lay the individual webs of sheet, directly on the roof of a building or in a separate manufacturing plant, so that their edges to be connected overlap, to apply a welding solvent between the overlapping edges by means of a brush and then to press the connecting edges provided with the welding solvent together until the said edges are firmly welded together.

A welding solvent distinguishes itself from a normal adhesive by the fact that it completely evaporates after connection of the two webs of sheet and that the connection between these webs of sheet is obtained solely by temporarily dissolving and, respectively, plasticizing the plastic material so that a connection similar to a welded connection is obtained under pressure. Tetrahydrofurane, an inflammable and hygroscopic liquid with a boiling point of between 64° and 66°C, may be used as such a welding solvent.

The manufacture of connecting seams between plastic sheets has of late gained ground since the production of welding seams using high-frequency welding or thermowelding techniques is substantially more costly. In particular, the solvent welding process is applied to the field of covering buildings, such as roof covers, swimming-pool linings and in the erection of inflated halls.

A substantial disadvantage attaching to the known solvent welding processes, however, resides in the fact that the welding solvent is still applied manually and that much time is consumed in applying the welding solvent by brush from one end of the connecting seam to the other. It has also been found that it is difficult manually to apply a coat of welding solvent of uniform thickness which results in places where the plastic sheet is too heavily dissolved and where the connection is too week. In addition, the time elapsing between the application of the welding solvent and the pressing action as well as the time of pressing together cannot be perfectly controlled. It might now be attempted to avoid these inconveniences peculiar to the welding solvent by employing an automatic welding process for large webs of sheet using high-frequency or thermowelding processes. However, this would not eliminate the disadvantage that the welding seam must be produced proceeding gradually from end to the other since the welding heads used in the said two processes can have only a limited length because the power and, respectively, heat consumption would otherwise become too great. In addition, the cost reduction obtained by the introduction of the solvent welding process would in part be lost.

The present invention is therefore based on the necessity of providing, while the solvent welding process proven in the manufacture of large sheets made of plastics is retained, automation which is free from the said disadvantages of other automation possibilities and substantially reduces the inconveniences peculiar to the solvent welding process.

According to this invention, which is designed to solve the said problem, the welding solvent is simultaneously applied over the entire length of a connecting seam to be produced between two webs of sheet, and the connecting pressure subsequently applied for a certain length of time, again simultaneously over the entire length.

Application of the welding solvent could be obtained, by way of example, by wetting rolls extending over the entire length of the connecting seam, the said rolls being impregnated with welding solvent and lowered, after a swinging movement, to the connecting edge prior to connecting. In contradistinction to the high-frequency or thermowelding process, this enables a uniform and, above all, simultaneous application of the welding solvent over the entire length of the connecting seam to be thus secured with comparatively simple equipment. The application of the welding solvent is advantageously effected in uniform dosage over the entire length of the connecting seam. This enables the connecting seams to be plasticized only over a relatively low depth while the structure of the areas adjacent to the outside of the sheet are only immaterially altered by the evaporating welding solvent. By way of example, the dissolving out of plasticizers and/or stabilizers from the sheet web edges to be connected, which reduces the stability of the sheet, can be placed under far closer control than possible in manual solvent welding.

Instead of replacing the brush commonly employed in solvent welding by a roll, the invention prefers application of the welding solvent by spraying. This enables the application to be accurately dosed and particularly simple means to be employed to effect such application.

Similarly to the manner described above in respect of the wetting roll, the spray nozzles may naturally be approached to the edges to be connected in a certain working cycle. According to this invention, however, preference is given to a mode of operation in which the area of at least one web of sheet to be coated with the welding solvent is held, during the spraying of the welding solvent, into the spray at an angle outwardly directed relative to the main surface of the web of sheet. It is possible then to arrange the spray nozzles fixedly and first to hold the area to be sprayed into the spray by bending and then to move it towards the associated area so that both are interconnected. It is advantageous to screen the spray in respect of the sheet material outside the connecting edge so that no deterioration of the area not used for connection by incipient dissolving or plasticizing by the welding solvent can occur, which might entail detrimental affection of strength and the destruction of the surface.

A simple and space-saving mode of operation is secured in accordance with the invention if, when pressing together the connecting edges provided with the welding solvent, the laid area of one web of sheet is moved relatively to the laid surface of the other web. Accordingly, the edge of the web of sheet can be moved into the spray only by moving the entire laid surface and then pressing together can also be effected by moving the laid surface.

According to this invention, constructionally very simple means enable, in a working cycle identical over the entire length of the connecting seam, the welding solvent to be applied and then the surfaces to be welded by means of the welding solvent to be accurately pressed together, the quantity of the welding solvent being capable of being accurately dosed while uniform application to only the surfaces required for connection is ensured. All this can be performed fully automatically, if desired also semi-automatically, with an extremely simple apparatus.

A suitable device for the performance of the method according to this invention comprises the combination of two essentially adjacent supporting surfaces for laying one of two webs of sheet to be connected, at least one pressing member reciprocable relative to the laying surface in the area of adjacent edges of the two supporting surfaces, the said pressing member extending over the entire width of the supporting surfaces employed for laying, and a device for the application of the welding solvent which extends over the same width and effective also in the area of adjacent edges of the two supporting surfaces. The laying surfaces may be located on the same plane if two pressing members operative in opposite directions are provided in the area of adjacent edges of the two supporting surfaces. However, it is better for one supporting surface to be located higher, at least in the area of adjacent edges, than the other since a spray of the welding solvent can then be applied without a complicated movement of the spraying nozzles. For bending the sheet web edge and subsequently pressing, one supporting surface may be made adjustable in height relatively to the other in order to save one pressing member. This secures the advantage of lesser height requirements than imposed by particular pressing members operating from above and from below. The supporting surface of which the height can be adjusted may be arranged so as to be swivellable in a simple manner. Also when the welding solvent is applied by means other than spraying nozzles, this swivelling action of the sheet web edges may be advantageous. Generally it offers the advantage that the connecting seam is obtained at a certain angle relative to the plane of the sheet so that the formation of folds is obviated.

Advantageously, however, the device for the application of the welding solvent is formed by evenly distributed spraying nozzles which are fixedly arranged, particularly where the foil edges can be swivelled, and of which the spray is advantageously directed substantially in parallel with the laying surface so that it impinges essentially only on the bent area.

Bending can also be achieved by providing that at least one pressing member can be swung into the spray independently of the laying surface around an axis extending along the area of adjacent edges of the two supporting surfaces. This swinging motion may be controlled positively in dependence on the height adjustment of the pressing member. In order that the surface to be wetted by the welding solvent when the pressing member is tilted can actually be tilted into the path of the spray, under-pressure or vacuum suction openings are provided in the pressing member along the length of the pressing surface. This vacuum suction may also be of advantage if the sheet should only be lifted in order that a device for the application of the solvent can be slipped underneath.

In order to screen the spray from the sheet surfaces not required for connection, it is advantageous to employ a simple shield extending vertically relative to the spray nozzles, which may biased towards the laying surface by a spring, preferably against a surface of the pressing member so that it will always have its edge facing the sheet on the latter in order to prevent the formation of a gap detrimentally affecting the screening effect. The shield may be directly inserted in a pressing member of a simple manner.

It is advantageous to provide the device for applying the welding solvent with an automatic dosage device for the welding solvent.

If, according to this invention, the supporting surface and/or the surface of at least one pressing member area of adjacent edges of the said surface is formed of a resilient material, the pressure can be better distributed over the areas to be connected and the formation of folds in the sheet and of vapour cushions in the area of the welding seam counteracted. The preferred resilient material is an artificial leather foam coating or a similar elastic design.

In order to place the sheet in a position in which it should be connected and in order to be able to convey the connected sheet away, at least one supporting surface is advantageously designed as an endless conveyor belt.

The means provided by this invention thus enables fully automatic operation with a substantial improvement of solution welding accompanied by a saving of time and a general reduction of costs to be achieved. The sheet seams are held immobile during setting so that an almost ideal solution welding seam may be obtained. In addition, the cycles may follow one another so rapidly that the welding solution, which is generally highly hygroscopic, will not absorb air humidity, which is a particular source of danger where work is performed directly on the roofs of buildings, i.e., in the open air, and which causes very considerable deterioration of the quality of welding seams. In general, work may be performed at room temperature while warming may be of advantage in order to accelerate the welding process which is performed under pressure. However, much caution is required in this case since, e.g., tetrahydrofurane is highly inflammable. According to this invention, films of very small thickness as well as very thick sheets may be perfectly welded in automatic operation.

The present invention will now be described in two embodiments with reference to diagrammatic drawings in which:

FIG. 4 is a cross-section of an alternative embodiment of a device according to this invention during the spraying process, and FIG. 5 shows the device according to FIG. 4 in the same cross-section during the pressing of the connecting seam.

Figure 1:
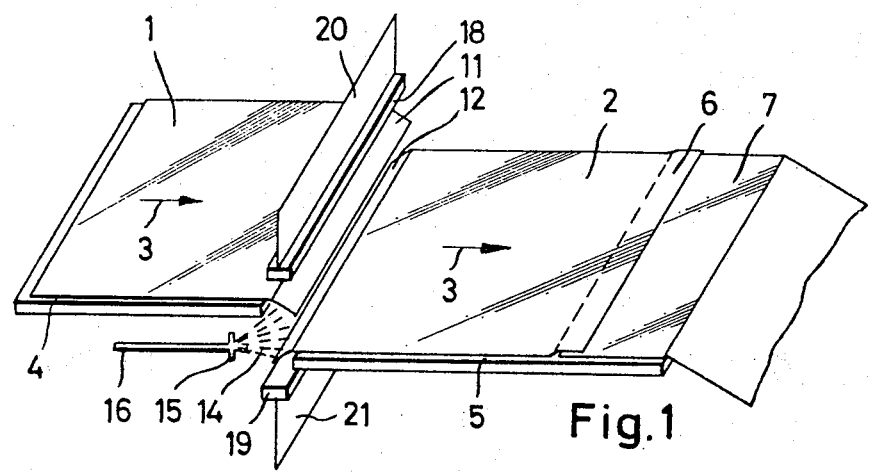
FIG. 1 is a side view of a device according to this invention during the spraying of the welding solution.

FIG. 1 shows that two webs of sheet 1 and 2 have been placed on the supporting surfaces 4 and 5 in the direction of the arrow 3. The sheet 2 may already be connected, according to this invention, with a previous sheet, as indicated by the seam 6 by which the sheet 2 is already connected with a sheet 7.

The flat supporting surfaces 4 and 5 formed as table tops may also be replaced by endless belts.

As seen in FIG. 1, the supporting surface 5 is arranged at a lower level than the supporting surface 4 and the edges 11 and 12 to be connected are bent by their own weight so that they are angled into the spray 14 produced by fixed spraying nozzles 15 arranged below the supporting surface 4. The spraying nozzles 15 are arranged, regularly spaced, over the entire length of the connecting seam to be produced, on a system of lines which supply the welding solvent dosed by means of a conventional dosing device.

Figure 2:
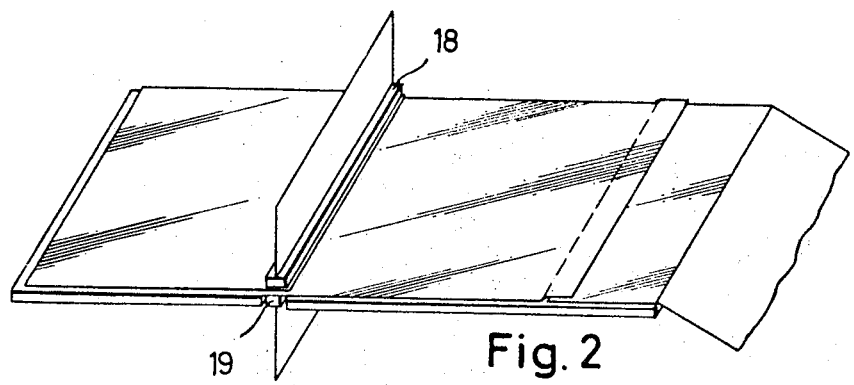
FIG. 2 shows the device according to FIG. 1 during the pressing together of two sheet web edges provided with welding solution.

After applying the welding solvent by spraying, the supporting surface 5 is moved upwards; at the same time, the pressing bars 18 and 19 extending over the entire length of the solvent welded seam to be produced are forced together by means of a diagrammatically shown actuating mechanism 20 and 21 respectively until the connecting seam has set. FIG. 2 shows the device according to FIG. 1 during the pressing operation on the connecting seam.

Figure 3A:
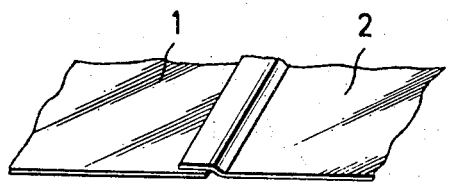
FIGS. 3a and 3b show two possible connecting seams.
Figure 3B:
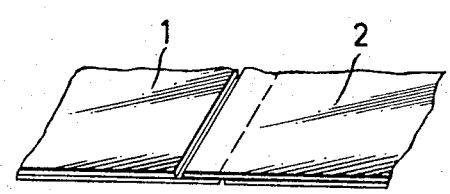

FIGS. 3a and 3b show two alternative possibilities of producing the connecting seam. The two sheets may be connected simply by overlapping their ends as shown in FIG. 3a. On the other hand, the overlapping edges may previously be so reduced in thickness that the two sheets 1 and 2 are connected to form a flat sheet as per FIG. 3b. This can be performed quite readily particularly when the sheet is originally made of two or more laminations. It is even possible to obtain sheets approximately reduced in thickness at the connecting edges from the sheet manufacturers direct by specifying that the two sheets combined into a two-film laminate be so connected that shoulders are formed along the edges which can be connected in accordance with FIG. 3b.

The embodiment according to FIGS. 4 and 5 is similar to that of FIGS. 1 and 2.

It is seen that the supporting surface 35 is arranged so as to be tilted from the position shown in FIG. 4 where spraying is effected, to the position according to FIG. 5 where the surfaces wetted by the welding solvent are pressed together.

The supporting surface 36 remains immobile throughout; arranged under and parallel with it similarly to FIG. 1 is the device for the application of the welding solvent formed by a number of spraying nozzles 45.

The two pressing members 48 and 49 are jointed to actuating rods 52 and 53 at 50 and 51. The surfaces of these members are covered with plastic foam leather and provided with vacuum suction openings. These suction openings are designed positively to bend the edges 61 and 62 of the sheets 1 and 2 into the spray coming from the spraying nozzles 45. Particularly the suction openings in the lower pressing member 51 are essential to move the sheet.

In order to prevent the spray from wetting the upper surface of the web of sheet 2, a shield 70 guided by the pressing member 48 is provided which is continuously biased against the sheet 2 by means of a spring 71 so that no gap can occur between the shield 70 and the sheet 2 which would allow the spray to pass on to the upper surface of the sheet 2.

What is claimed is:

1. A method of automatically joining together sheets of plastic materials by interconnecting individual webs thereof, comprising the steps of:
   a. arranging a first and a second of said sheets to be joined together and positioning said sheets such that the individual edges thereof to be joined together are adjacent to each other and overlap;
   b. bending one of said edges in an upward direction and the other of said edges in a downward direction thereby providing a gap extending along said edges;
   c. spraying a plastics welding solvent simultaneously onto the adjacent surface of said bent edges;
   d. closing said gap after a period of time sufficient to cause at least a partial dissolution of said surfaces thus sprayed and thereafter pressing said overlapping edges together at least until an inseparable connection therebetween results;
   e. moving said interconnected first and second sheets, arranging a third individual sheet with its edge overlapping the free edge of said second sheet and repeating steps (a) through (d).

* * * * *